US009852252B2

(12) United States Patent
Baek et al.

(10) Patent No.: US 9,852,252 B2
(45) Date of Patent: Dec. 26, 2017

(54) STANDARD CELL LIBRARY AND METHODS OF USING THE SAME

(71) Applicant: Samsung Electronics Co., Ltd., Suwon-si, Gyeonggi-do (KR)

(72) Inventors: Sang-hoon Baek, Seoul (KR); Tae-joong Song, Seongnam-si (KR); Jae-ho Park, Suwon-si (KR); Gi-young Yang, Seoul (KR); Jin-tae Kim, Suwon-si (KR); Hyo-sig Won, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 187 days.

(21) Appl. No.: 14/801,239

(22) Filed: Jul. 16, 2015

(65) Prior Publication Data

US 2016/0055284 A1    Feb. 25, 2016

Related U.S. Application Data

(60) Provisional application No. 62/040,719, filed on Aug. 22, 2014.

(30) Foreign Application Priority Data

Nov. 27, 2014  (KR) ........................ 10-2014-0167817

(51) Int. Cl.
*G06F 17/50* (2006.01)
(52) U.S. Cl.
CPC ...... *G06F 17/5072* (2013.01); *G06F 17/5031* (2013.01); *G06F 17/5077* (2013.01); *G06F 2217/84* (2013.01)

(58) Field of Classification Search
USPC ........................................................ 716/119
See application file for complete search history.

(56) References Cited

U.S. PATENT DOCUMENTS

| 6,536,027 | B1 * | 3/2003 | Grinchuk | G06F 17/5077 716/129 |
|---|---|---|---|---|
| 7,315,994 | B2 | 1/2008 | Aller et al. | |
| 7,547,597 | B2 | 6/2009 | Kau et al. | |
| 7,681,162 | B2 | 3/2010 | Tanaka | |
| 8,063,416 | B2 | 11/2011 | Kishishita | |
| 8,247,846 | B2 | 8/2012 | Becker | |
| 8,258,572 | B2 | 9/2012 | Liaw | |
| 8,490,043 | B2 | 7/2013 | Gupta et al. | |
| 8,766,322 | B2 | 7/2014 | Okamoto et al. | |
| 2008/0155486 | A1 * | 6/2008 | Trevillyan | G06F 17/5045 716/122 |
| 2008/0169487 | A1 | 7/2008 | Shimbo et al. | |
| 2011/0018064 | A1 | 1/2011 | Doornbos | |

(Continued)

*Primary Examiner* — Bryce Aisaka
(74) *Attorney, Agent, or Firm* — Myers Bigel, P.A.

(57) ABSTRACT

A standard cell library and a method of using the same may include information regarding a plurality of standard cells stored on a non-transitory computer-readable storage medium, wherein at least one of the plurality of standard cells includes a pin through which an input signal or an output signal of the at least one standard cell passes and including first and second regions perpendicular to a stack direction. When the via is disposed in the pin, the second region can provide a resistance value of the via smaller than that of the first region. The standard cell library may further include marker information corresponding to the second region.

19 Claims, 13 Drawing Sheets

(56) References Cited

U.S. PATENT DOCUMENTS

2012/0135600 A1\* 5/2012 Lin .................. H01L 22/10
 438/667
2012/0278781 A1 11/2012 Wann et al.
2014/0097493 A1 4/2014 Baek et al.
2014/0110767 A1 4/2014 Anderson et al.
2014/0189635 A1 7/2014 Yang et al.

\* cited by examiner

STANDARD CELL LIBRARY AND METHODS OF USING THE SAME

CROSS-REFERENCE TO RELATED APPLICATIONS

This U.S. non-provisional patent application claims priority from U.S. Provisional Patent Application No. 62/040,719 filed on Aug. 22, 2014, in the U.S. Patent and Trademark Office and Korean Patent Application No. 10-2014-0167817 filed on Nov. 27, 2014, in the Korean Intellectual Property Office, and all the benefits accruing therefrom under 35 U.S.C. §119, the contents of which are herein incorporated by reference in their entireties.

BACKGROUND

As semiconductor processing technology has developed, the sizes of transistors have been reduced and thus, more transistors are capable of being integrated into a single semiconductor device. For example, a system-on-chip (SOC), which refers to an integrated circuit (IC) integrating all components of a computer or another electronic system into a single chip, is widely used for various applications. As application performance has improved, there is a demand for semiconductor devices including more components.

As the sizes of transistors integrated in semiconductor devices have been reduced, the level of complexity of the process of manufacturing the semiconductor devices has become increased. That is, a defective semiconductor device that does not operate normally may be included in semiconductor devices manufactured through the semiconductor manufacturing process. A reduction in the frequency of occurrence of such a defective semiconductor device, i.e. an increase in yield, is needed. In addition, characteristics of the semiconductor device may deteriorate due to the high level of complexity of the semiconductor process. Means for improving performance of an IC included in semiconductor devices are needed by preventing or reducing the deterioration of the characteristics of the semiconductor device.

SUMMARY

Example embodiments of the inventive concepts relate to a standard cell library and methods of using the same, and more particularly, to a standard cell library stored in a non-transitory computer-readable storage medium and methods of using the same.

Embodiments of the inventive concepts can provide a standard cell library including information regarding a plurality of standard cells and stored on a non-transitory computer-readable storage medium. At least one of the plurality of standard cells may include a pin through which an input signal or an output signal of the at least one standard cell passes and may include first and second regions perpendicular to a stack direction. When the via is disposed in the pin, the second region may provide a resistance value of the via smaller than that of the first region. The standard cell library may further include marker information corresponding to the second region.

In some embodiments according to the inventive concepts, the standard cell library may further include information regarding resistance values of the candidate via locations in the first and second regions.

In some embodiments according to the inventive concepts, the second region may be defined in such a manner that the candidate via disposed in the second region is spaced apart from a boundary of the pin in first and second directions perpendicular to each other by at least first and second distances respectively or is spaced apart from the boundary of the pin in the first direction and a third direction that are opposite to each other by at least the first distance.

In some embodiments according to the inventive concepts, the pin may include a plurality of candidate points in which the via can be disposed, wherein each of the first and second regions includes some of the plurality of candidate points, and wherein the marker information corresponds to the candidate points included in the second region.

In some embodiments according to the inventive concepts, the plurality of candidate points may be spaced apart from each other by at least a predetermined distance.

In some embodiments according to the inventive concepts, the marker information may be included in the standard cell library as a virtual layer.

Embodiments of the inventive concepts can provide a method of using a standard cell library including information regarding a plurality of standard cells. The method may include receiving input data defining an integrated circuit (IC) including at least one of the plurality of standard cells, the at least one of the plurality of standard cells including a pin which includes first and second regions perpendicular to a stack direction, accessing a non-transitory computer-readable storage medium storing the standard cell library, the standard cell library further including marker information corresponding to the second region, and placing and routing the at least one of the plurality of standard cells included in the IC by disposing a via in the second region rather than the first region based on the marker information.

In some embodiments according to the inventive concepts, if the via is disposed in the second region of the pin, a resistance value of the via is smaller than if the via is placed in the first region of the pin.

In some embodiments according to the inventive concepts, the placing and routing the at least one of the plurality of standard cells may include analyzing a timing characteristic of the IC based on the resistance value of the via disposed in the second region.

In some embodiments according to the inventive concepts, the placing and routing the at least one of the plurality of standard cells may include selecting a first standard cell connected to a critical path of the IC for disposing the via in the second region rather than other standard cells included in the IC not connected to the critical path of the IC.

In some embodiments according to the inventive concepts, when the via is disposed in the second region of the pin, the second region may be defined in such a manner that the via is spaced apart from a boundary of the pin in first and second directions perpendicular to each other by at least first and second distances respectively or is spaced apart from the boundary of the pin in the first direction and a third direction that are opposite to each other by the at least first distance.

In some embodiments according to the inventive concepts, the placing and routing the at least one of the plurality of standard cells may include placing first and second patterns respectively on first and second layers to be formed after forming the pin during a semiconductor process. The via may connect the first and second patterns. The placing of the first and second patterns may include disposing the via in a region spaced apart from a boundary of the first or second pattern by more than a previously determined distance in at least two directions from among four directions perpendicular to a stack direction of the plurality of standard cells.

In some embodiments according to the inventive concepts, the placing and routing the at least one of the plurality of standard cells may further include disposing the via according to a grid defined in a layout of the IC.

In some embodiments according to the inventive concepts, the method may further include generating output data defining the IC including the placed and routed standard cells.

In some embodiments according to the inventive concepts, the method may be performed by a processor configured to execute a plurality of instructions.

Embodiments of the inventive concepts can provide a computer program product including a non-transitory computer readable storage medium having computer readable program code embodied in the computer readable storage medium that when executed by a processor causes the processor to perform operations. The operations may include receiving input data defining an integrated circuit (IC) comprising a plurality of standard cells. At least one of the plurality of standard cells may include a stack of a plurality of layers arranged in a first direction, a via connecting a first layer and a second layer of the plurality of layers, and a pin within the first layer of the plurality of layers. The pin may include first and second regions extending in a second and third direction perpendicular to the first direction. The second region may provide a lower resistance value of the via when the via is placed within the second region. The operations may also include receiving input data including marker information corresponding to the second region of the pin, determining a location for the via in the pin based on a location of the second region and a timing characteristic of the IC based on the resistance value of the via, and generating output data defining a layout of the IC.

In some embodiments according to the inventive concepts, the second region may be defined as an area within the pin at least a first predetermined distance from a boundary of the pin in the second direction, and at least a second predetermined distance from a boundary of the pin in the third direction.

In some embodiments according to the inventive concepts, determining the location for the via in the pin based on the location of the second region may include determining a plurality of candidate points within the second region in which the via can be disposed In some embodiments according to the inventive concepts, determining the location for the via in the pin may further include determining a critical path of the plurality of standard cells of the IC. The location for the via in the pin may be selected in the second region of the pin if the at least one standard cell is in the critical path of the plurality of standard cells of the IC.

In some embodiments according to the inventive concepts, receiving input data including marker information corresponding to the second region of the standard cell may include accessing a non-transitory storage medium containing a standard cell library and generating the marker information from the standard cell library corresponding to the second region.

In some embodiments according to the inventive concepts, an outer boundary of the via is entirely within an outer boundary of the second region.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
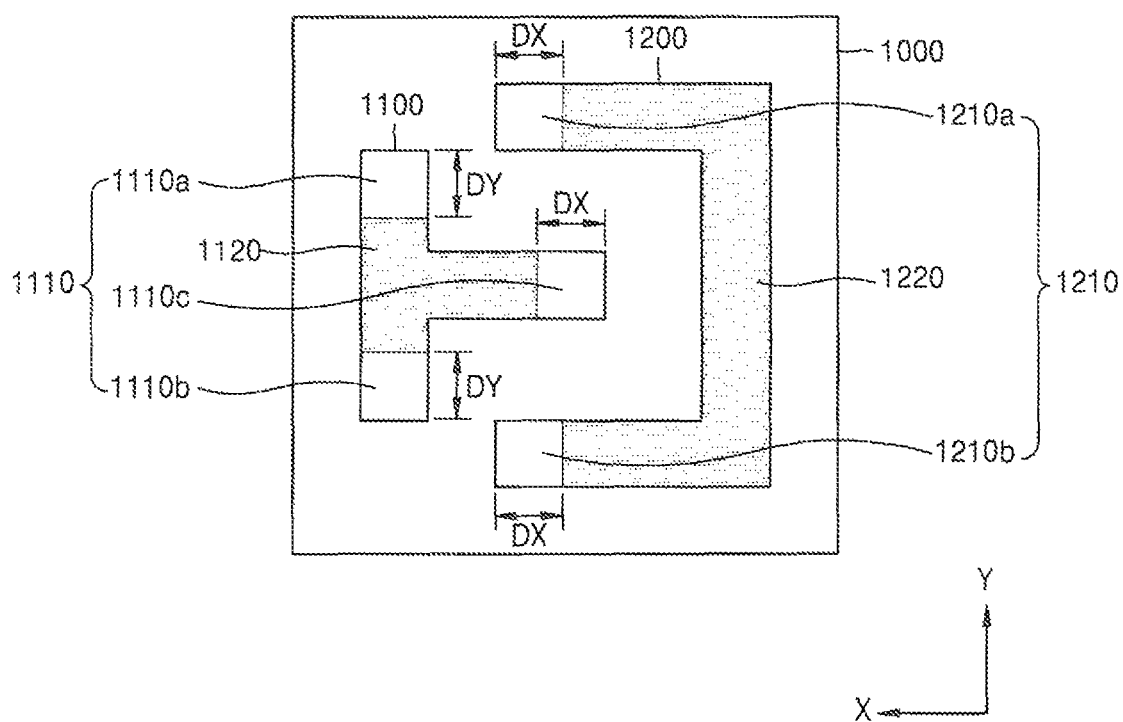
FIG. 1 is a schematic diagram of an example of a standard cell corresponding to information included in a standard cell library, according to example embodiments of the inventive concepts.

Various example embodiments will now be described more fully with reference to the accompanying drawings in which some example embodiments are shown. Accordingly, while example embodiments are capable of various modifications and alternative forms, the example embodiments are shown by way of example in the drawings and will herein be described in detail. It should be understood, however, that there is no intent to limit the example embodiments to the particular forms disclosed, but on the contrary, the example embodiments are to cover all modifications, equivalents, and alternatives falling within the scope of the inventive concepts. Like numbers refer to like elements throughout the description of the figures. In the appended drawings, sizes of structures are exaggerated for clarity of the inventive concepts.

The terminology used herein is for the purpose of describing example embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Example embodiments of aspects of the present inventive concepts explained and illustrated herein include their complementary counterparts.

Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Devices and methods of forming devices according to various embodiments described herein may be embodied in microelectronic devices such as integrated circuits, wherein a plurality of devices according to various embodiments described herein are integrated in the same microelectronic device. Accordingly, the cross-sectional view(s) illustrated herein may be replicated in two different directions, which need not be orthogonal, in the microelectronic device. Thus, a plan view of the microelectronic device that embodies devices according to various embodiments described herein may include a plurality of the devices in an array and/or in a two-dimensional pattern that is based on the functionality of the microelectronic device.

The devices according to various embodiments described herein may be interspersed among other devices depending on the functionality of the microelectronic device. Moreover, microelectronic devices according to various embodiments described herein may be replicated in a third direction that may be orthogonal to the two different directions, to provide three-dimensional integrated circuits.

FIG. 1 is a schematic diagram of an example of a standard cell 1000 corresponding to information included in a standard cell library, according to example embodiments of the inventive concepts. The standard cell library may include information regarding a plurality of standard cells and may be stored in a non-transitory computer-readable storage medium. A standard cell corresponding to the information included in the standard cell library is referred to as a unit of an integrated circuit (IC) satisfying a rule having a previously determined size of a layout thereof. For example, a height (for example, a length in a Y direction of FIG. 1 that is a plan view of the standard cell) of a layout of a standard cell may be uniform, and a width (for example, a length in an X direction of FIG. 1) of the standard cell may be different according to standard cells. The standard cell may include an input pin and an output pin, and may process an input signal received through the input pin, and may output an output signal through the output pin.

The IC may be defined as the plurality of standard cells. A tool for designing the IC may complete a design, i.e. a layout, of the IC by using the standard cell library including the information regarding the plurality of standard cells. The tool for designing the IC may dispose a via in a pin (i.e., an input pin or an output pin) included in the standard cell. A via may be used in an IC to connect different layers of the standard cell. In some embodiments, the via may connect the via to a pattern formed on a layer formed after forming pins of the standard cell during a semiconductor process. That is, the input signal of the standard cell or the output signal may pass through the via disposed in the pin of the standard cell.

As shown in FIG. 1, the standard cell 1000 may include two pins 1100 and 1200. As described above, a via may be disposed in the two pins 1100 and 1200, and thus an input signal of the standard cell 1000 or an output signal may pass through the via. Although FIG. 1 illustrates an example in which the standard cell 1000 includes the two pins 1100 and 1200, the standard cell 1000 corresponding to the information included in a standard cell library, according to example embodiments of the inventive concepts, is not limited thereto. The standard cell 1000 may include one pin or two or more pins.

According to example embodiments of the inventive concepts, the two pins 1100 and 1200 included in the standard cell 1000 may include first and second regions perpendicular to a stack direction (i.e. a direction perpendicular to X and Y directions of FIG. 1) of the standard cell 1000. For example, as shown in FIG. 1, the first pin 1100 may include a first region 1110 and a second region 1120, and the second pin 1200 may include a first region 1210 and a second region 1220. As will be described with reference to FIGS. 3 and 4 later, when the via is disposed in the pin 1100 or 1200 of the standard cell 1000, resistance of the via may differ according to a location of the via. In the figures described below, the stack direction of the standard cell 1000 is a Z direction, and the X and Y directions that are perpendicular to each other are perpendicular to the Z direction.

According to example embodiments of the inventive concepts, when the via is disposed in the pin 1100 or 1200 of the standard cell 1000, the second region (or a low resistance region) 1120 or 1220 may provide a lower resistance of the via than that of the first region (or a high resistance region) 1110 or 1210. That is, the via disposed in the second region 1120 or 1220 may have a lower resistance than that disposed in the first region 1110 or 1210. According to example embodiments of the inventive concepts, the standard cell library may include marker information corresponding to the second region 1120 or 1220. The marker information may be used by a tool for designing an IC.

According to example embodiments of the inventive concepts, when the via is disposed in the second region 1120 or 1220 of the pin 1100 or 1200, the second region 1120 or 1220 may be defined in such a manner that the via may be spaced apart from a boundary of the pin 1100 or 1200 by more than a predetermined distance in at least two directions among four directions (i.e. +X, −X, +Y, and −Y directions) perpendicular to the stack direction (i.e. the direction perpendicular to X and Y directions of FIG. 1) of the standard cell 1000. For example, as shown in FIG. 1, in some embodiments, when the via is disposed in the second region 1120 of the first pin 1100, the via may be spaced apart from the boundary of the first pin 1100 by more than a first distance DX and a second distance DY, respectively, in a first direction (for example, +X or −X direction) and a second direction (for example, +Y or −Y direction) that are perpendicular to each other. In some embodiments, when the via is disposed in the second region 1120 of the first pin 1100, the via may be spaced apart from the boundary of the first pin 1100 by more than the first distance DX or the second distance DY in the first direction (for example, +X or +Y direction) and the second direction (for example, −X or −Y direction) that are opposite to each other.

According to example embodiments of the inventive concepts, as the second region 1120 or 1220 of the pin 1100 or 1200 is defined as described above, the first region 1110 or 1210 corresponding to the pin 1100 or 1200 excluding the second region 1120 or 1220 may include one or more sub regions. For example, as shown in FIG. 1, the first region 1110 of the first pin 1100 may include three sub regions 1110a, 1110b, and 1110c. Likewise, the first region 1210 of the second pin 1200 may include two sub regions 1210a and 1210b.

According to example embodiments of the inventive concepts, the first distance DX or the second distance DY may be determined according to the resistance of the via and/or characteristics of the semiconductor process of manufacturing the IC including the standard cell. For example, the first distance DX or the second distance DY may be determined with respect to a start point of a region in which the resistance rapidly starts to decrease since the via is disposed away from the boundary of the pin 1100 or 1200. According to example embodiments of the inventive concepts, the first distance DX or the second distance DY may be the same or different.

Figure 2:
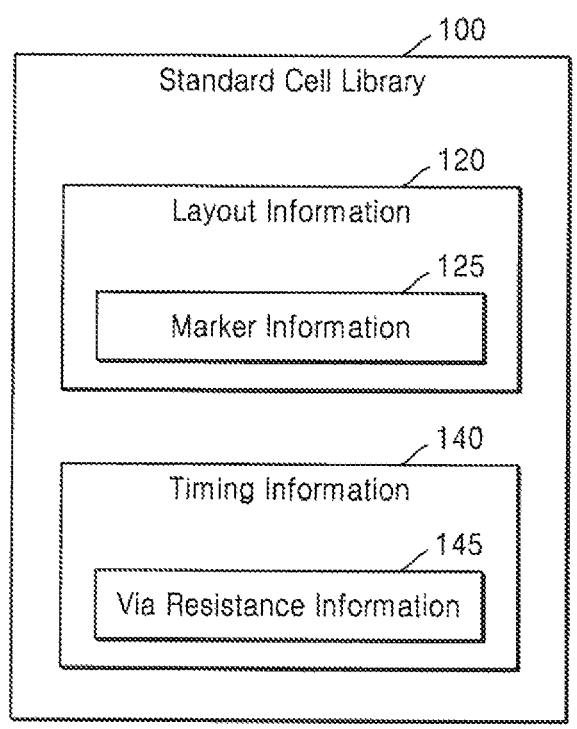
FIG. 2 is a diagram of an example of a standard cell library, according to example embodiments of the inventive concepts.

FIG. 2 is a diagram of an example of a standard cell library 100, according to example embodiments of the inventive concepts. As described above, the standard cell library 100 according to example embodiments of the inventive concepts may include information regarding a plurality of standard cells. That is, the standard cell library 100 may include, for example, information regarding a layout function of a standard cell, timing information, power information, or layout information. As shown in FIG. 2, the standard cell library 100 according to example embodiments of the inventive concepts may include layout information 120 and timing information 140. Each of the layout information 120 and the timing information 140 may include data corresponding to layout and timing characteristics of the plurality of standard cells included in the standard cell library 100.

Referring to FIG. 1, the layout information 120 included in the standard cell library 100 according to example embodiments of the inventive concepts may include marker information 125 corresponding to the second regions 1120 and 1220 of the pins 1100 and 1200, respectively, included in the standard cell 1000. As described with reference to FIG. 1, a tool for designing an IC may use the standard cell library 100 and may place a via in the pins 1100 and 1200 based on the marker information 125 included in the standard cell library 100. For example, the tool for designing the IC may reduce an influence of resistance generated due to the via of the IC by primarily placing the via in the second regions 1120 and 1220.

The timing information 140 included in the standard cell library 100 according to example embodiments of the inventive concepts may include via resistance information 145. The tool for designing the IC may analyze a timing characteristic with respect to a path of a signal including the via based on the via resistance information 145 included in the standard cell library 100. Referring to FIG. 1, the via resistance information 145 according to example embodiments of the inventive concepts may include information regarding resistance of the via disposed in the first regions 1110 and 1210 and resistance of the via disposed in the second regions 1120 and 1220. Accordingly, the tool for designing the IC may analyze the timing characteristic of the IC by accurately reflecting the resistance of the via due to a location of the via in the pins 1100 and 1200 of the standard cell 1000.

Figure 3:
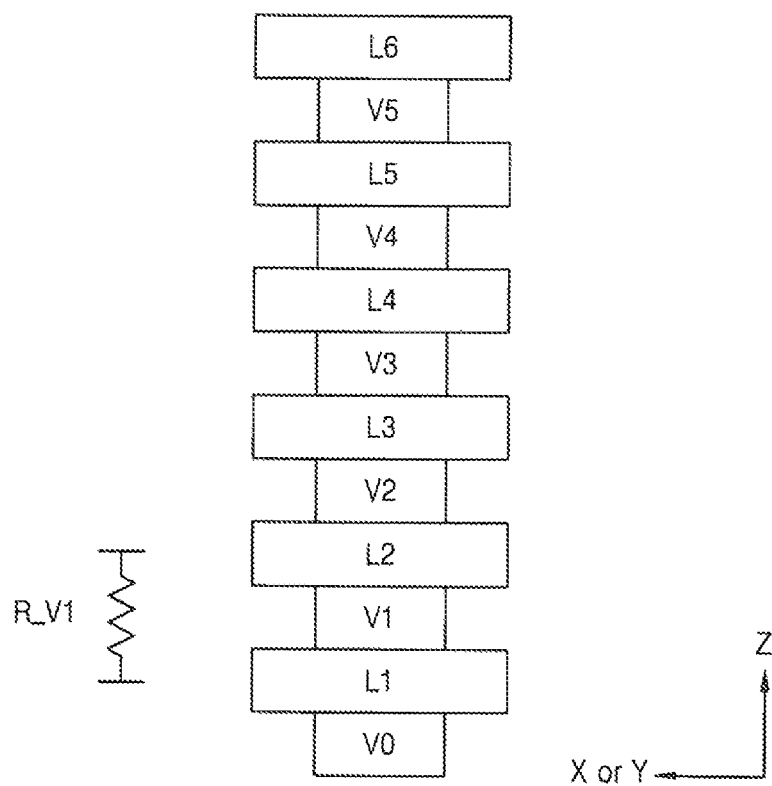
FIG. 3 is a diagram of various vias included in an integrated circuit (IC), according to example embodiments of the inventive concepts.

FIG. 3 is a diagram of various vias included in an IC, according to example embodiments of the inventive concepts. The IC may be manufactured through a semiconductor process and may include a plurality of layers. For example, the semiconductor process may include a plurality of deposition operations and etching operations. The IC (or a semiconductor device including the IC) may include a plurality of layers formed through a plurality of operations. Although FIG. 3 illustrates six layers and vias, it will be understood that the IC according to example embodiments of the inventive concepts may include more or less than 6 layers and/or vias.

The vias may electrically connect conductors disposed on different layers. For example, as described with reference to FIG. 1, the pins 1100 and 1200 included in the standard cell 1000 and patterns of other layers may be electrically connected through the vias. In addition, the vias may be used to electrically connect patterns included in layers formed after forming the pins 1100 and 1200 of the standard cell 1000 during a semiconductor process. For example, as shown in FIG. 3, the IC may include a plurality of layers L1 through L6 stacked in a Z direction. Vias V0 through V5 may be disposed between the layers L1 through L6. In FIG. 3, the via V0 may electrically connect patterns included in a pin (not shown) of a standard cell and the layer L1.

A via that connects not only a pin of a standard cell but also patterns of different layers may generate resistance between both ends of the via due to a material constituting the via or a surface contacting a pin or a pattern of a layer. For example, as shown in FIG. 3, the via V1 connecting patterns included in the two layers L1 and L2 may generate resistance having a resistance value R_V1 that is, for example, several tens of ohms (Ω). The resistance generated by the via may incur a delay of a signal in a path of the signal including the via. The greater the value of the resistance, the greater the delay of the signal. An increase in the delay of the signal directly influences a reduction of an operating frequency at which the IC operates, and thus a reduction in the resistance generated by the via is an important factor in improving performance of the IC.

Figure 4:
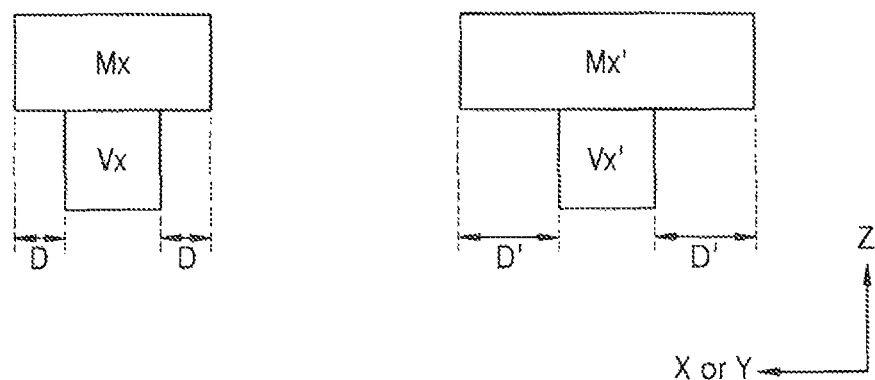
FIG. 4 is a diagram of an example of vias having different resistance values.
Figure 5:
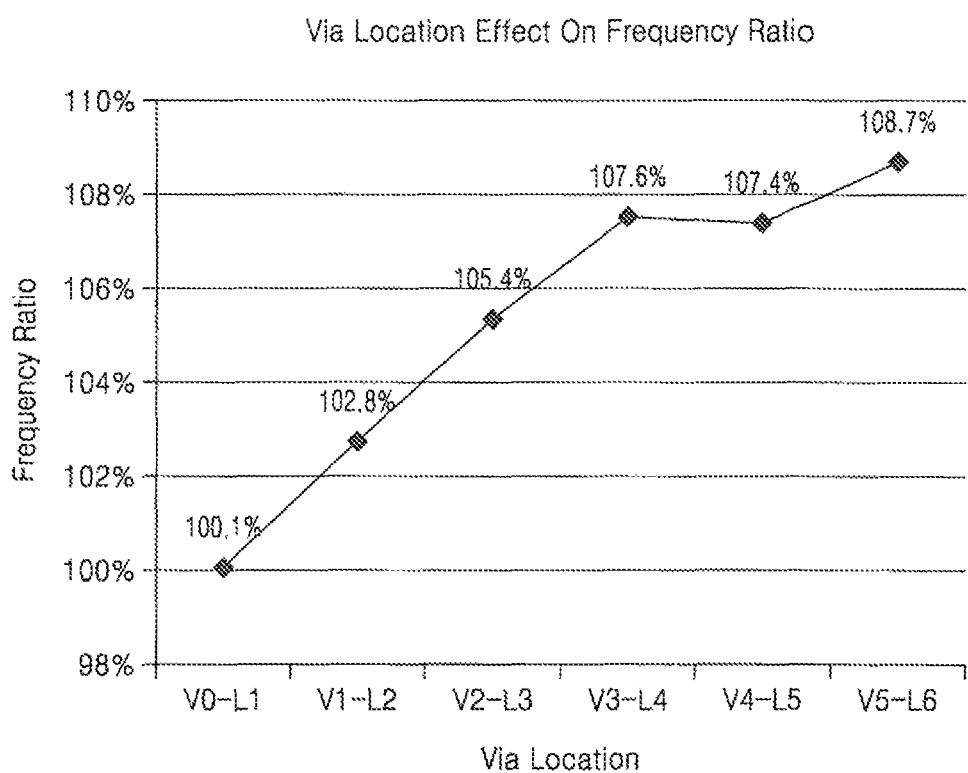
FIG. 5 is a graph showing a reduction effect on the resistance values of vias based on locations of the vias.

FIG. 4 is a diagram of an example of vias having different resistance values. FIG. 5 is a graph showing a reduction effect on the operating frequency of the IC as a function of resistance values of vias based on locations of the vias. In more detail, FIG. 4 is a cross-sectional view of a via taken along a surface parallel to a stack direction (a Z direction) of an IC and perpendicular to an X or Y direction, and FIG. 5 illustrates an increase ratio of an operating frequency due to vias having reduced resistance values. As shown in the left of FIG. 4, a via Vx is spaced apart from a boundary of a pattern Mx by a distance D in the X direction or in the Y direction. As shown in the right of FIG. 4, a via Vx' is spaced apart from a boundary of a pattern Mx' by a distance D' in the X direction or in the Y direction. For example, the distance D or D' may be several tens of nanometers, and the distance D' may be 1.5 or 2 times the distance D. In the present example, it is assumed that the patterns Mx and Mx' are patterns included in the same layer.

The level of complexity of a semiconductor process may increase due to a reduction in a size of a transistor included in the IC and a width of a pattern, and thus a via may be formed to have an incomplete shape rather than an ideal shape as shown in FIG. 4. For example, a material filled in the via may not be sufficiently deposited or an outer shape of the via may not be completely formed in an etching operation. A via formed in an incomplete shape may form resistance having a relatively high resistance value, and may even generate a defect in which both ends of the via are not electrically connected.

As shown in FIG. 5, an experimental result shows that a via disposed farther away from a boundary of a pattern (or a pin included in a standard cell) has a lower resistance value than that of a via disposed closer to the boundary. That is, in the example of FIG. 4, the via Vx' spaced apart from the boundary of the pattern Mx' by the distance D' in the X direction or in the Y direction may have a lower resistance value than that of the via Vx spaced apart from the boundary of the pattern Mx by the distance D. For example, the experimental result shows that the via Vx' may have a resistance value reduced by more than 40% compared to a resistance value of the via Vx. In more detail, referring to FIG. 3, as shown in FIG. 5, when a via is spaced relatively far apart from a boundary of a pattern in each of the layers L1 through L6 of the IC, an increase in an operating frequency of 8.7% to the maximum may occur due to a reduced delay of a signal owing to a lower resistance value.

A standard cell library according to example embodiments of the inventive concepts may include marker information corresponding to a second region defined as a region spaced apart from a boundary of a pin by more than a predetermined distance in at least two directions among four directions, thereby providing information for improving performance of an IC to a tool configured to design the IC. Accordingly, the IC designed by using the standard cell library according to example embodiments of the inventive concepts may have an improved performance, for example, a relatively high operating frequency. A yield of a semiconductor device including the IC designed by using the standard cell library according to example embodiments of the inventive concepts may also be improved, thereby reducing redundant vias for implementing the same connection for reliability of a connection in the semiconductor device.

Figure 6:
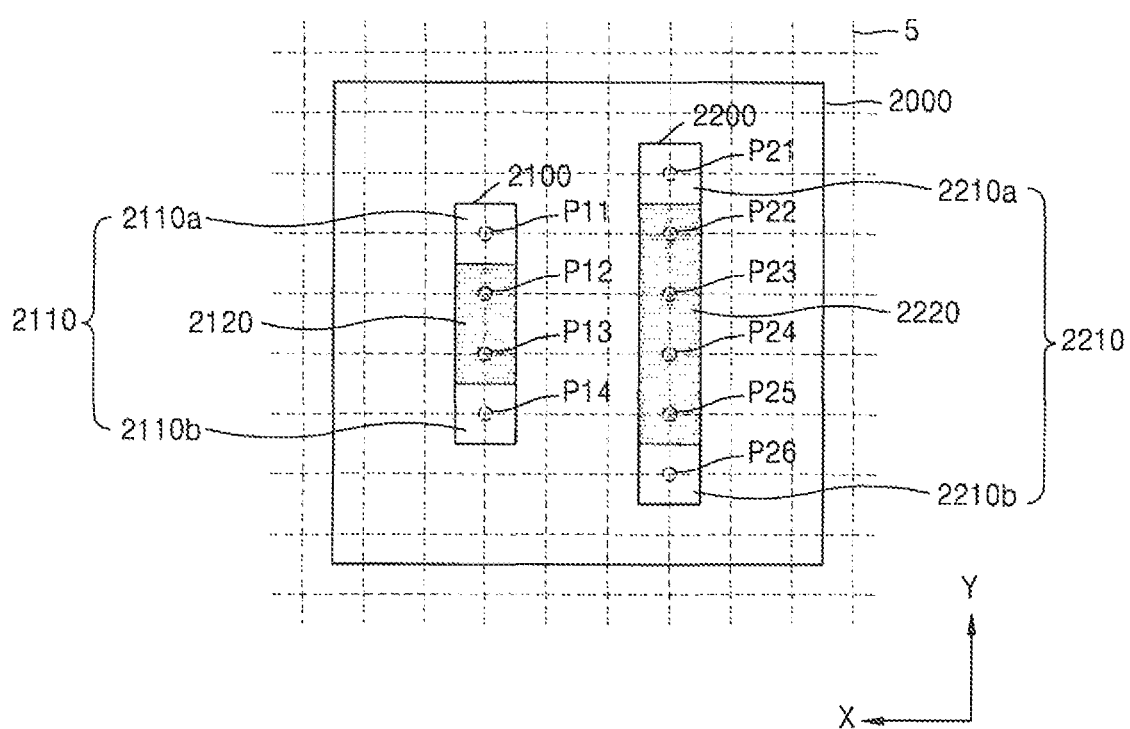
FIG. 6 is a schematic diagram of an example of a standard cell corresponding to information included in a standard cell library, according to example embodiments of the inventive concepts.

FIG. 6 is a schematic diagram of an example of a standard cell 2000 corresponding to information included in a standard cell library, according to example embodiments of the inventive concepts. According to example embodiments of the inventive concepts, a pin included in a standard cell may include a limited number of points in which vias may be disposed. A tool using the standard cell library and designing an IC may place vias according to a grid 5 defined on a layout of the IC and form patterns. Accordingly, the pin included in the standard cell may include the limited number of points in which the vias may be disposed according to the grid 5. Each of first and second regions of the pin may include some of the limited number of points.

As shown in FIG. 6, the standard cell 2000 may include a first pin 2100 and a second pin 2200. The first pin 2100 may include a first region 2110 and a second region 2120. The second pin 2200 may include a first region 2210 and a second region 2220. The first region 2110 of the first pin 2100 may include two sub regions 2110a and 2110b. The first region 2210 of the second pin 2200 may include two sub regions 2210a and 2210b.

As shown in FIG. 6, the first pin 2100 of the standard cell 2000 may include four points P11 through P14 in which vias may be disposed according to a grid 5 defined in X and Y directions, and the second pin 2200 of the standard cell 2000 may include six points P21 through P26 in which vias may be disposed according to the grid 5. The first region 2110 of the first pin 2100 may include the two points P11 and P14. The second region 2120 of the first pin 2100 may include the two points P12 and P13. The first region 2210 of the second pin 2200 may include the two points P21 and P26. The second region 2220 of the second pint 2200 may include the four points P22 through P25.

According to example embodiments of the inventive concepts, marker information included in the standard cell library may correspond to points included in a second region of a pin included in the standard cell. For example, as shown in FIG. 6, the marker information may include information indicating locations of the two points P12 and P13 included in the second region 2120 of the first point 2100 and the four points P22 through P25 included in the second region 2220 of the second pin 2200. That is, according to example embodiments of the inventive concepts, the marker information may include information regarding a limited number of points instead of, or in addition to, coordinate information corresponding to circumferences of the second regions 2120 and 2220.

Figure 7:
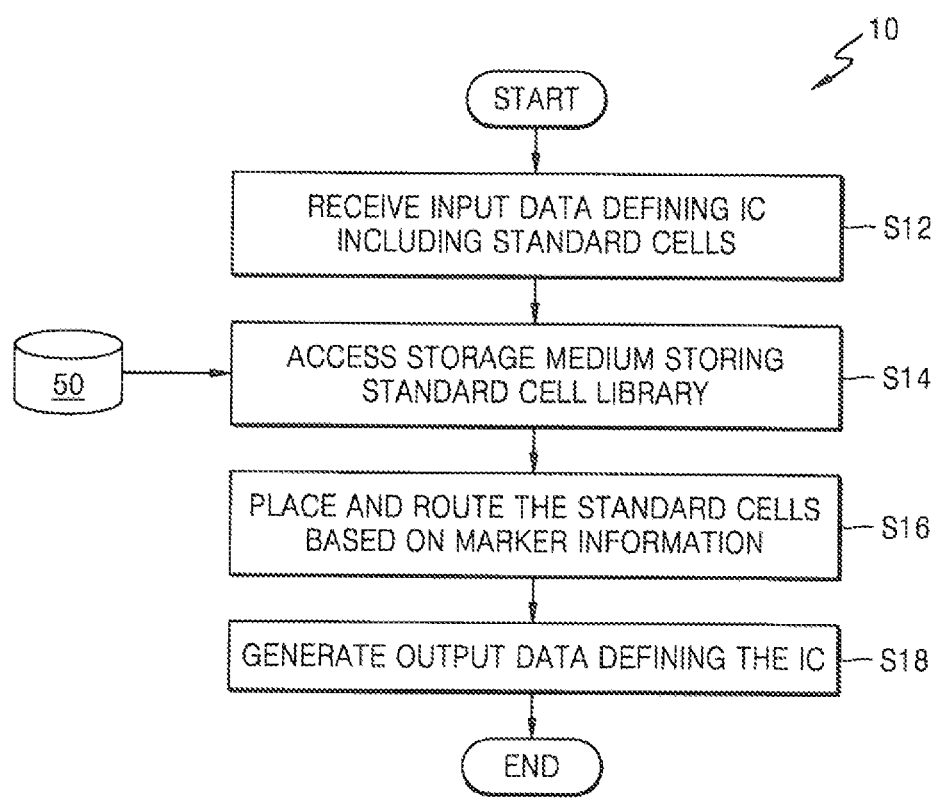
FIG. 7 is a flowchart of a method of using a standard cell library, according to example embodiments of the inventive concepts.

FIG. 7 is a flowchart of a method 10 of using a standard cell library, according to example embodiments of the inventive concepts. The method 10 of using the standard cell library may be performed in a tool for designing an IC. The tool for designing the IC may be a program including a plurality of instructions executed by a processor.

As shown in FIG. 7, the method 10 of using the standard cell library may include an operation (S12) of receiving input data defining the IC including standard cells. The input data may be data generated through synthesis by using the standard cell library from an abstract form of a behavior of the IC, for example, data defined in a register transfer level (RTL). For example, the input data may be a bitstream or a netlist generated when synthesizing an IC defined using, for example, a hardware description language (HDL) such as Very High Speed Integrated Circuit HDL (VHDL) or Verilog.

According to example embodiments of the inventive concepts, the method 10 of using the standard cell library may include an operation (S14) of accessing a storage medium 50 storing the standard cell library. In some embodiments, the storage medium 50 may be non-transitory. As described above, the standard cell library according to example embodiments of the inventive concepts may include marker information that may correspond to a second region providing a low resistance value when a via is disposed in a pin of a standard cell corresponding to information included in the standard cell library. According to example embodiments of the inventive concepts, the standard cell library may be stored in the storage medium 50, and the tool for designing the IC may be configured to access the storage medium 50 to use the standard cell library.

According to example embodiments of the inventive concepts, the method 10 of using the standard cell library may include an operation (S16) of placing and routing standard cells based on the marker information included in the standard cell library. The input data may include information regarding standard cells included in the IC and a connection relationship between the standard cells. The method 10 of using the standard cell library may place and route the standard cells included in the IC, thereby completing a layout of the IC.

According to example embodiments of the inventive concepts, the operation (S16) of placing and routing the standard cells included in the IC may include placing a via primarily in a second region rather than a first region based on the marker information included in the standard cell library. The via placed in the second region may have a lower resistance value than that of the via placed in the first region, and thus the via may be primarily placed in the second region in the operation (S16) of placing and routing the standard cells included in the IC. In some embodiments, the via placed in the second region may improve performance of the IC and improve a yield of a semiconductor device including the IC.

According to example embodiments of the inventive concepts, the operation (S16) of placing and routing the standard cells included in the IC may include an operation of analyzing a timing characteristic of the IC based on the resistance value of the via disposed in the second region. For example, the operation of analyzing the timing characteristic of the IC may include extracting resistance values of vias disposed in the first and second regions based on the via resistance information 145 included in the timing information 140 of the standard cell library 100 as shown in FIG. 2 and analyzing the timing characteristic of the IC based on the extracted resistance values. As described above, the vias disposed in the first and second regions may have different resistance values, and thus the timing characteristic of the IC may be analyzed based on the via resistance information 145. Based on the analyzed timing characteristic and a previously determined timing constraint, some of the standard cells included in the IC may be placed or routed again.

The operation (S16) of placing and routing the standard cells included in the IC may include observing a previously determined design rule. For example, referring to FIG. 6, when two vias are disposed in each of the second region 2120 of the first pin 2100 and the second region 2220 of the second pin 2200, the two vias may be spaced apart from each other by more than a distance defined in a via-to-via rule included in the design rule.

According to example embodiments of the inventive concepts, the method 10 of using the standard cell library may include an operation (S18) of generating output data defining the IC. The output data may define the IC including the standard cells placed and routed according to the operation (S16) of placing and routing the standard cells included in the IC based on the marker information included in the standard cell library. According to example embodiments of the inventive concepts, the output data may include pieces of layout information of the standard cells, i.e. a format including pattern information of the layers such as, for example, a Graphic Database System (GDS) format, or a format including external information of the standard cells like a pin of a standard cell such as, for example, a Library Exchange Format (LEF), or a Milkyway format.

Figure 8:
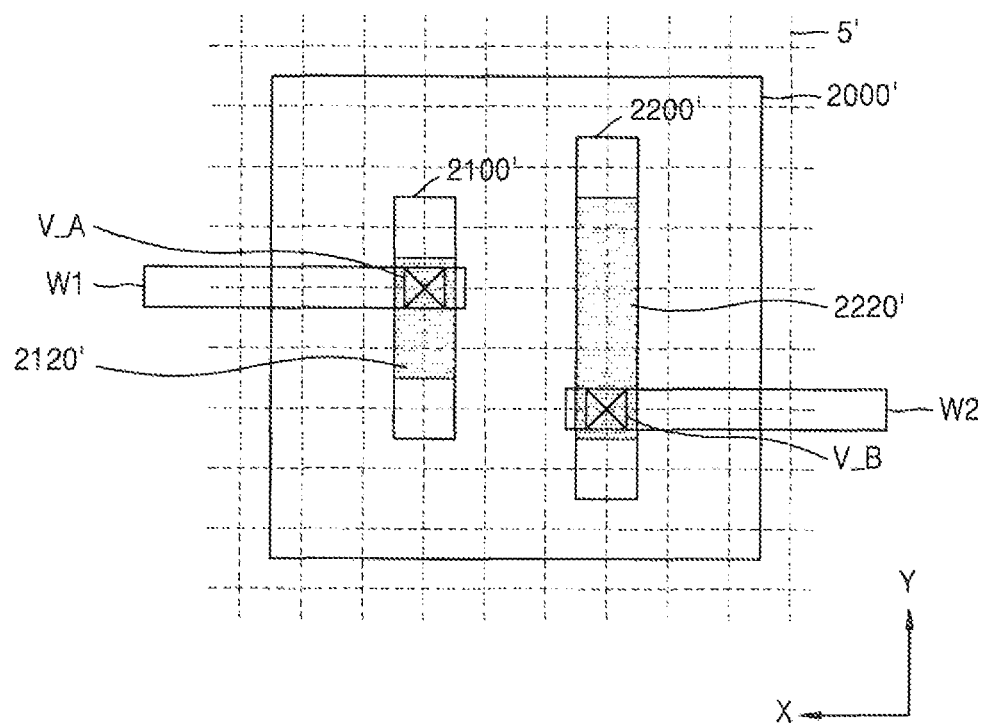
FIG. 8 is a diagram of an example of the routed standard cell of FIG. 6, according to example embodiments of the inventive concepts.

FIG. 8 is a diagram of an example of a standard 2000' cell of FIG. 6, routed according to example embodiments of the inventive concepts. As shown in FIG. 8, the standard cell 2000' may include a first pin 2100' and a second pin 2200', and may be placed and routed in a layout of an IC according to a grid 5'. Two vias V_A and V_B may be respectively disposed in a second region 2120' of the first pin 2100' and a second region 2220' of the second pin 2200'. The via V_A disposed in the first pin 2100' may connect the first pin 2100' of the standard cell 2000' and a pattern W1. The via V_B disposed in the second pin 2200' may connect the second pin 2200' of the standard cell 2000' and a pattern W2.

Referring to the points of FIG. 6, the via V_A may be primarily disposed in the second region 2120', and thus the via V_A may be disposed in one of the two points P12 and P13. The via V_B may be primarily disposed in the second region 2220', and thus the via V_B may be disposed in one of the four points P22 through P25. The vias V_A and V_B may be determined to be disposed in one of the priority candidate points P12, P13, and P22 through P25 in consideration of another standard cell outside the standard cell 2000' or a pattern. The vias V_A and V_B may be disposed in one of priority candidate points such that the vias V_A and V_B may be spaced apart from each other by more than a predetermined distance based on a design rule, for example, a via-to-via rule. Due to these constraints, a via may be disposed not in a second region but in a first region. Marker information included in a standard cell library may correspond to priority candidate points, i.e. the points P12 and P13 of the first pin 2100' and the points P22 through P25 of the second pin 2200'. The vias V_A and V_B may be primarily disposed in the second region rather than the first region based on the marker information.

Figure 9:
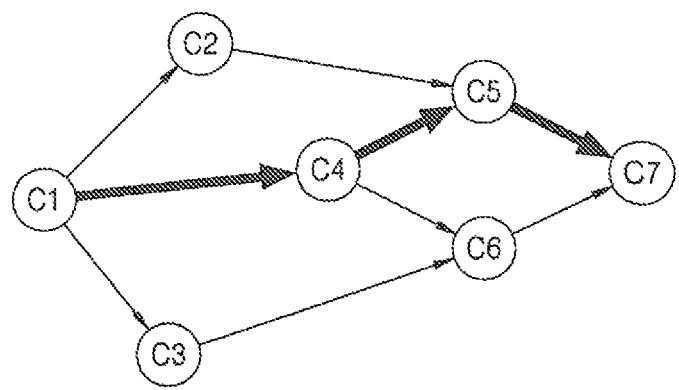
FIG. 9 is a diagram for explaining an operation of placing and routing standard cells based on marker information of FIG. 7, according to example embodiments of the inventive concepts.

FIG. 9 is a diagram for explaining the operation (S16) of placing and routing standard cells based on the marker information of FIG. 7, according to example embodiments of the inventive concepts. A part of a plurality of standard cells included in an IC may form a critical path. The critical path may be referred to as a path of a signal influencing a timing characteristic during an operation of the IC such as, for example, a path of a signal having the longest delay time. A timing characteristic of the IC may be dependent upon a characteristic of the critical path. The critical path may include standard cells connected to the critical path and signal lines connecting the standard cells.

The operation (S16) of placing and routing the standard cells based on the marker information of FIG. 7 according to example embodiments of the inventive concepts may include primarily placing vias in second regions of pins included in the standard cells connected to the critical path of the IC rather than other standard cells included in the IC. For example, as shown in FIG. 9, in an IC including 7 standard cells C1 through C7, the critical path may include four standard cells C1, C4, C5, and C7 and three signal lines (bold arrows). The operation (S16) of placing and routing the standard cells based on the marker information may include primarily placing vias in second regions of pins included in four cells C1, C4, C5, and C7 included in (or connected to) the critical path rather than other standard cells C2, C3, and C6. Accordingly, the vias included in the critical path may have smaller resistance values, and reduce a delay of a signal in the critical path, thereby contributing to an improvement in the timing characteristic of the IC.

Figure 10:
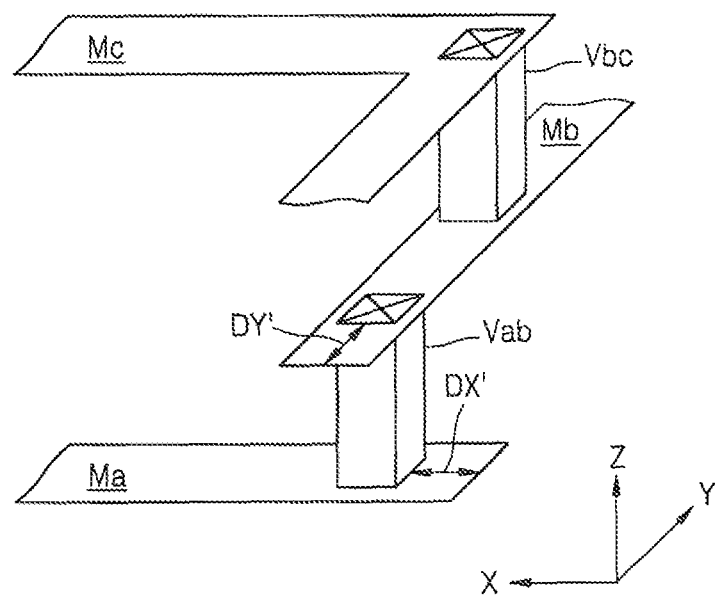
FIG. 10 is a diagram for explaining an operation of placing and routing standard cells based on marker information of FIG. 7, according to other example embodiments of the inventive concepts.

FIG. 10 is a diagram for explaining the operation (S16) of placing and routing standard cells based on the marker information of FIG. 7, according to other example embodiments of the inventive concepts. As described with reference to FIG. 3, an IC may include vias connecting a plurality of layers and patterns included in the plurality of layers. For example, as shown in FIG. 10, three patterns Ma, Mb, and Mc may be disposed in different layers, a via Vab may connect the two patterns Ma and Mb, and a via Vbc may connect the two patterns Mb and Mc.

According to example embodiments of the inventive concepts, the operation (S16) of placing and routing the standard cells of FIG. 7 may include an operation of routing the standard cells by forming patterns included in layers formed after forming pins of the standard cells during a semiconductor process. The operation of routing the standard cells by forming the patterns may include primarily disposing vias connecting the patterns in a region spaced apart from boundaries of the patterns by more than a previously determined distance in at least two directions among four directions (+X, −X, +Y, and −Y directions of FIG. 10) perpendicular to a stack direction (Z direction of FIG. 10) of the standard cells rather than other regions of the patterns.

As shown in FIG. 10, the via Vab may be spaced apart from a boundary of the pattern Ma in the −X direction by a predetermined distance DX' and may be spaced apart from the boundary of the pattern Ma in the +X direction by more than the distance DX'. The via Vab may be spaced apart from a boundary of the pattern Mb in the −Y direction by a predetermined distance DY' and may be spaced apart from the boundary of the pattern Mb in the +Y direction by more than the distance DY'. As shown in FIG. 10, the Vbc may be spaced apart from the boundary of the pattern Mb in the +Y and −Y directions by more than the distance DY'. The via Vbc may be spaced apart from a boundary of the pattern Mc in the +X direction by more than the distance DX' and may be spaced apart from the boundary of the pattern Mc in the −Y direction by more than the distance DY'. Not only vias disposed in pins included in the standard cells but also the vias disposed in the patterns included in the plurality of layers of the IC according to example embodiments of the inventive concepts may be primarily disposed to be spaced apart from boundaries of the patterns by more than a predetermined distance, and thus the vias may have small resistance values. Accordingly, a delay in a signal of a signal line including the vias may be reduced.

Figure 11:
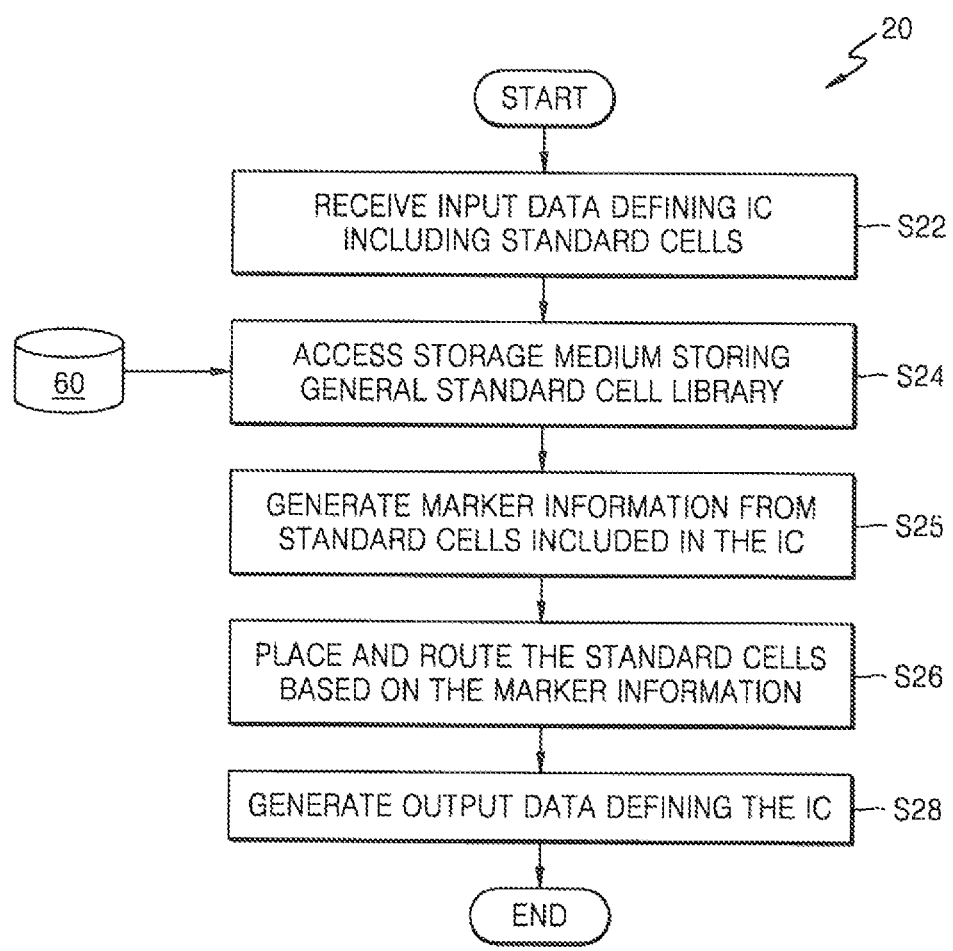
FIG. 11 is a flowchart of a method of designing an IC, according to example embodiments of the inventive concepts.

FIG. 11 is a flowchart of a method of designing an IC, according to example embodiments of the inventive concepts. The method of designing the IC may be performed by a tool configured to design the IC. The tool configured to design the IC may be a program including a plurality of instructions executed by a processor. Compared to the method (10) of using the standard cell library of FIG. 7, the method of designing the IC of FIG. 10 may use a general standard cell library, i.e. a standard cell library not including marker information, and may generate marker information.

As shown in FIG. 1, the method (20) of designing the IC may include an operation (S22) of receiving input data defining the IC including standard cells. For example, the input data may be a bitstream or a netlist generated when synthesizing the IC defined using an HDL such as, for example, VHDL or Verilog. The method (20) of designing the IC may include an operation (S24) of accessing a storage medium 60 storing the general standard cell library. In some embodiments, the storage medium 60 may be non-transitory. The general standard cell library may include layout information and timing information of a standard cell.

According to example embodiments of the inventive concepts, the method (20) of designing the IC may include an operation (S25) of generating the marker information from standard cells included in the IC. The operation (S25) of generating the marker information may include extracting information of a pin included in each of the standard cells included in the IC based on the general standard cell library, partitioning first and second regions from the extracted information of the pin, and generating the marker information corresponding to the second region. For example, the operation (S25) of generating the marker information may include partitioning the first and second regions from the information of the pin included in the standard cell based on a previously determined distance measured from a boundary of the pin included in the standard cell. The previously determined distance may be determined in advance by a designer when the method (20) of designing the IC is performed or may be defined by a design rule.

According to example embodiments of the inventive concepts, the method (20) of designing the IC may include an operation (S26) of placing and routing the standard cells based on the generated marker information. The operation (S26) of placing and routing the standard cells included in the IC may include primarily disposing a via in the second region rather than the first region based on the generated marker information. The via disposed in the second region may have a smaller resistance value than that of the via disposed in the first region, and thus the operation (S26) of placing and routing the standard cells included in the IC may include primarily disposing the via in the second region. In some embodiments, primarily disposing the via in the second region may improve performance of the IC and improve a yield of a semiconductor device including the IC.

According to example embodiments of the inventive concepts, the method (20) of designing the IC may include an operation (S28) of generating output data defining the IC. For example, the output data may have a type including layout information of the standard cells like, for example, a GDS type or may have a type including outside information of the standard cell like, for example, a LEF or Milkyway type.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, server, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, server, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, server, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
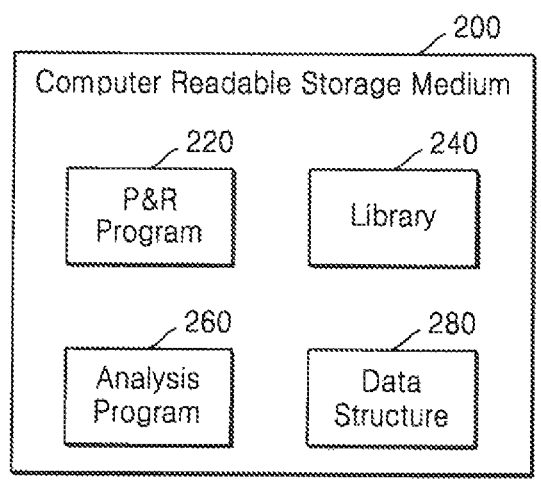
FIG. 12 is a block diagram of a computer readable storage medium, according to example embodiments of the inventive concepts.

FIG. 12 is a block diagram of a computer readable storage medium 200, according to example embodiments of the inventive concepts. The computer readable storage medium 200 may include an arbitrary storage medium that may be read by a computer while the computer readable storage medium 200 is used to provide instructions and/or data to the computer. In some embodiments, the computer readable storage medium 200 may be non-transitory. Examples of the computer readable storage medium 200 may include a magnetic or optical medium such as a compact disc-read only memory (CD-ROM), a digital versatile disc-ROM (DVD-ROM), a compact disc-recordable (CD-R), a compact disc re-writable (CD-RW), a DVD-R, or a DVD-RW, a volatile or nonvolatile memory such as a random-access memory (RAM), a ROM, or a flash memory, a nonvolatile memory that may be accessed via a universal serial bus (USB) interface, and a microelectromechanical system (MEMS). The computer readable storage medium 200 may be inserted into the computer, integrated into the computer, or may be coupled to the computer via a medium such as a network and/or a wireless link.

As shown in FIG. 12, the computer readable storage medium 200 may include a place and route program 220, a library 240, an analysis program 260, and a data structure 280. The place and route program 220 may include a plurality of instructions for performing a method of using a standard cell library or a method of designing an IC according to example embodiments of the inventive concepts. For example, the computer readable storage medium 200 may store the place and route program 220 including arbitrary instructions configured to perform partially or wholly the methods represented by the flowcharts illustrated in one or more of the above-described figures.

The library 240 may include information regarding a standard cell that is a unit constituting the IC. For example, the library 240 may store a standard cell library including marker information like the storage medium 50 of FIG. 7 or may store a standard cell library that does not include marker information like the storage medium 60 of FIG. 11.

The analysis program 260 may include a plurality of instructions configured to perform a method of analyzing the IC based on data defining the IC. For example, the computer readable storage medium 200 may include the analysis program 260 including arbitrary instructions configured to perform a method of analyzing a timing characteristic of the IC based on resistance values of vias disposed in a first region (high resistance region) and a second region (low resistance region). The data structure 280 may include a storage space configured to manage data generated during a process of using the standard cell library included in the library 240, configured to extract the marker information from a general standard cell library included in the library 240, or configured to analyze the timing characteristic of the IC by the analysis program 260.

Figure 13:
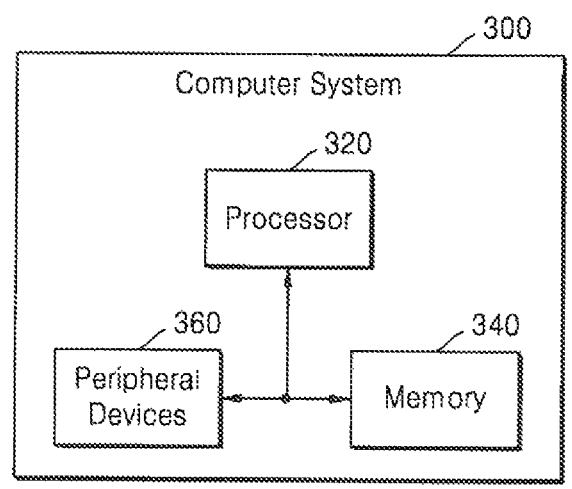
FIG. 13 is a block diagram of a computer system, according to example embodiments of the inventive concepts.

FIG. 13 is a block diagram of a computer system 300, according to example embodiments of the inventive concepts. As shown in FIG. 13, the computer system 300 may include a processor 320, a memory 340, and various peripheral devices 360. The processor 320 may be connected to the memory 340 and the peripheral devices 360.

The processor 320 may be configured to execute instructions for performing at least one of the afore-described methods according to the example embodiments of the inventive concepts. According to example embodiments of the inventive concepts, the processor 320 may execute an arbitrary instruction set (for example, Intel architecture (IA)-32, 64 bit extension IA-32, X86-64, PowerPC, Sparc, microprocessor without interlocked pipeline stage (MIPS), advanced reduced instruction set computer machine (ARM), or IA-64). Also, the computer system 300 may include one or more processors.

The processor 320 may be arbitrarily connected to the memory 340 and the peripheral devices 360. For example, the processor 320 may be connected to the memory 340 and/or the peripheral devices 360 through various interconnections. Alternatively, one or more bridge chips may generate multi-connections between the processor 320, the memory 340, and the peripheral devices 360 and may be used to connect the components.

The memory 340 may include an arbitrary memory system. Examples of the memory 340 may include a dynamic random-access memory (DRAM), a double data rate synchronous dynamic random-access memory (DDR SDRAM), and a Rambus DRAM (RDRAM). A memory controller may be provided in order to interface with the memory 340 and/or the processor 320 may include the memory controller. The memory 340 may store the instructions for performing the method of using the standard cell library or designing the IC and data that is processed by the processor 320.

The peripheral devices 360 may include arbitrary hardware devices that may be included in the computer system 300 or may be coupled to the computer system 300, for example, a storage device and an input/output device (e.g., video hardware, audio hardware, user interface devices, or networking hardware).

While the inventive concepts have been particularly shown and described with reference to example embodiments thereof by using specific terms, the example embodiments and terms have merely been used to explain the inventive concepts and should not be construed as limiting the scope of the inventive concepts as defined by the claims. The example embodiments should be considered in a descriptive sense only and not for purposes of limitation. Therefore, the scope of the inventive concepts is defined not by the detailed description of the inventive concepts but by the appended claims, and all differences within the scope will be construed as being included in the inventive concept.

What is claimed is:

1. A method of operating a computing device for designing an integrated circuit (IC) using a standard cell library comprising information regarding a plurality of standard cells, the method comprising:

receiving input data at the computing device defining the IC comprising at least one of the plurality of standard cells, the at least one of the plurality of standard cells comprising a pin which comprises first and second regions perpendicular to a stack direction;

accessing a non-transitory computer readable storage medium storing the standard cell library that is coupled to the computing device, the standard cell library further comprising marker information corresponding to the second region of the pin; and placing and routing, by a processor of the computing device, the at least one of the plurality of standard cells included in the IC by disposing a via in the second region of the pin rather than the first region of the pin based on the marker information, wherein, if the via is disposed in the second region of the pin, a resistance value of the via is smaller than if the via is placed in the first region of the pin, and wherein the second region is spaced apart from at least a part of a boundary of the pin.

2. The method of claim 1, wherein the placing and routing the at least one of the plurality of standard cells comprises:
placing first and second patterns respectively on first and second layers to be formed after forming the pin during a semiconductor process,
wherein the via connects the first and second patterns, and
wherein the placing of the first and second patterns comprises disposing the via in a region spaced apart from the boundary of the first or second pattern by more than a previously determined distance in at least two directions from among four directions perpendicular to the stack direction.

3. The method of claim 1, wherein the placing and routing the at least one of the plurality of standard cells further comprises disposing the via according to a grid defined in a layout of the IC.

4. The method of claim 1, further comprising generating output data defining the IC comprising the placed and routed standard cells.

5. The method of claim 4, further comprising manufacturing the IC using the generated output data defining the IC.

6. The method of claim 1, wherein the second region is spaced apart from at least a part of boundary of the pin by a first distance, and
wherein the first region is within the pin and spaced apart from at least a part of the boundary of the pin by a second distance, less than the first distance.

7. A method of operating a computing device for designing an integrated circuit (IC) using a standard cell library comprising information regarding a plurality of standard cells,
the method comprising:
receiving input data at the computing device defining the IC comprising at least one of the plurality of standard cells, the at least one of the plurality of standard cells comprising a pin which comprises first and second regions perpendicular to a stack direction;
accessing a non-transitory computer readable storage medium storing the standard cell library that is coupled to the computing device, the standard cell library further comprising marker information corresponding to the second region of the pin; and
placing and routing, by a processor of the computing device, the at least one of the plurality of standard cells included in the IC by disposing a via in the second region of the pin rather than the first region of the pin based on the marker information,
wherein, if the via is disposed in the second region of the pin, a resistance value of the via is smaller than if the via is placed in the first region of the pin, and
wherein the placing and routing the at least one of the plurality of standard cells comprises analyzing a timing characteristic of the IC based on the resistance value of the via disposed in the second region.

8. The method of claim 7, wherein when the via is disposed in the second region of the pin, the second region is defined in such a manner that the via is spaced apart from a boundary of the pin in first and second directions perpendicular to each other by at least first and second distances respectively or is spaced apart from the boundary of the pin in the first direction and a third direction that are opposite to each other by at least the first distance.

9. The method of claim 7, wherein the placing and routing the at least one of the plurality of standard cells comprises:
placing first and second patterns respectively on first and second layers to be formed after forming the pin during a semiconductor process,
wherein the via connects the first and second patterns, and
wherein the placing of the first and second patterns comprises disposing the via in a region spaced apart from a boundary of the first or second pattern by more than a previously determined distance in at least two directions from among four directions perpendicular to the stack direction.

10. The method of claim 7, wherein the placing and routing the at least one of the plurality of standard cells further comprises disposing the via according to a grid defined in a layout of the IC.

11. The method of claim 7, further comprising generating output data defining the IC comprising the placed and routed standard cells.

12. The method of claim 11, further comprising manufacturing the IC using the generated output data defining the IC.

13. A method of operating a computing device using for designing an integrated circuit (IC) a standard cell library comprising information regarding a plurality of standard cells, the method comprising:
receiving input data at the computing device defining the IC comprising at least one of the plurality of standard cells, the at least one of the plurality of standard cell comprising a pin which comprises first and second regions perpendicular to a stack direction;
accessing a non-transitory computer readable storage medium storing the standard cell library that is coupled to the computing device, the standard cell library further comprising marker information corresponding to the second region of the pin; and
placing and routing, by a processor of the computing device, the at least one of the plurality of standard cells included in the IC by disposing a via in the second region of the pin rather than the first region of the pin based on the marker information,
wherein, if the via is disposed in the second region of the pin, a resistance value of the via is smaller than if the via is placed in the first region of the pin, and
wherein the placing and routing the at least one of the plurality of standard cells comprises selecting a first standard cell connected to a critical path of the IC for disposing the via in the second region rather than other standard cells included in the IC not connected to the critical path of the IC.

14. The method of claim 13, wherein when the via is disposed in the second region of the pin, the second region is defined in such a manner that the via is spaced apart from a boundary of the pin in first and second directions perpendicular to each other by at least first and second distances respectively or is spaced apart from the boundary of the pin in the first direction and a third direction that are opposite to each other by at least the first distance.

15. The method of claim 13, wherein the placing and routing the at least one of the plurality of standard cells comprises:
placing first and second patterns respectively on first and second layers to be formed after forming the pin during a semiconductor process,
wherein the via connects the first and second patterns, and
wherein the placing of the first and second patterns comprises disposing the via in a region spaced apart from a boundary of the first or second pattern by more than a previously determined distance in at least two directions from among four directions perpendicular to the stack direction of the plurality of standard cells.

16. The method of claim 13, wherein the placing and routing the at least one of the plurality of standard cells further comprises disposing the via according to a grid defined in a layout of the IC.

17. The method of claim 13, further comprising generating output data defining the IC comprising the placed and routed standard cells.

18. The method of claim 17, further comprising manufacturing the IC using the generated output data defining the IC.

19. The method of claim 13, wherein the placing and routing the at least one of the plurality of standard cells further comprises selecting a second standard cell not connected to the critical path of the IC for disposing the via in the first region rather than other standard cells included in the IC connected to the critical path of the IC.

* * * * *